United States Patent
Ackermann et al.

(10) Patent No.: US 9,622,317 B2
(45) Date of Patent: Apr. 11, 2017

(54) LED RETROFIT LAMP

(71) Applicant: PHILIPS LIGHTING HOLDING B.V., Eindhoven (NL)

(72) Inventors: Bernd Ackermann, Aachen (DE); Haimin Tao, Eindhoven (NL); Georg Sauerlaender, Aachen (DE); Bernhard Christiaan Van Dijk, Geldrop (NL); Borong Su, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 14/907,171

(22) PCT Filed: Aug. 29, 2014

(86) PCT No.: PCT/EP2014/068434
§ 371 (c)(1),
(2) Date: Jan. 22, 2016

(87) PCT Pub. No.: WO2015/028639
PCT Pub. Date: Mar. 5, 2015

(65) Prior Publication Data
US 2016/0227622 A1    Aug. 4, 2016

(30) Foreign Application Priority Data

Aug. 29, 2013   (EP) .................................... 13182262

(51) Int. Cl.
*H05B 33/08*         (2006.01)
*F21V 23/06*         (2006.01)
(Continued)

(52) U.S. Cl.
CPC .......... *H05B 33/0884* (2013.01); *F21K 9/27* (2016.08); *F21V 23/06* (2013.01); *F21V 25/04* (2013.01);
(Continued)

(58) Field of Classification Search
CPC ....... F21V 25/04; F21K 9/17; H05B 33/0806; H05B 33/0815; H05B 33/0884;
(Continued)

(56) References Cited

U.S. PATENT DOCUMENTS 8,680,958 B2 * 3/2014 Radermacher ..... H01R 13/7037
                                              335/206
8,749,167 B2 * 6/2014 Hsia ........................ F21V 25/00
                                              315/209 R
(Continued)

FOREIGN PATENT DOCUMENTS

CN    CN201401757 Y    2/2010
EP    2381158 A2       10/2011
(Continued)

Primary Examiner — Vibol Tan (57) ABSTRACT

The present invention relates to an LED retrofit lamp (700) adapted for operation with an alternating current. The LED lamp comprises an LED unit (740), a mains current line, first and second switching devices (710, 720) (e.g., first and second relays), and a control unit (730). The control unit (730) detects an ignition voltage on the mains current line. In response to detecting the ignition voltage on the mains current line, the control unit (730) sets the first and second switching devices (710, 720) to a conducting state such that the LED unit (740) is connected to power. By using the first and second switching devices (710, 720), safety of the LED lamp (700) is improved, in particular when installing the lamp (700) into a fixture designed for fluorescent lamps.

12 Claims, 7 Drawing Sheets

(51) Int. Cl.
*F21V 25/04* (2006.01)
*F21K 9/27* (2016.01)

(52) U.S. Cl.
CPC ..... *H05B 33/0803* (2013.01); *H05B 33/0809* (2013.01); *H05B 33/0842* (2013.01); *Y02B 20/383* (2013.01); *Y02B 20/386* (2013.01)

(58) Field of Classification Search
CPC ............ H05B 33/0842; H05B 33/0845; H05B 33/083; Y02B 20/386
See application file for complete search history.

(56) References Cited

U.S. PATENT DOCUMENTS

| | | | | |
|---|---|---|---|---|
| 8,845,127 B2 * | 9/2014 | Deppe | ............... | F21V 25/04 |
| | | | | 362/217.13 |
| 8,860,312 B2 * | 10/2014 | Hollander | .......... | H05B 33/0809 |
| | | | | 315/178 |
| 8,917,020 B2 * | 12/2014 | Jans | ........... | F21K 9/17 |
| | | | | 315/127 |
| 9,095,023 B2 * | 7/2015 | Deppe | ................ | H05B 33/0809 |
| 2013/0076466 A1 | 3/2013 | Radermacher | | |
| 2013/0093309 A1 | 4/2013 | Deppe | | |

FOREIGN PATENT DOCUMENTS

| | | | | | |
|---|---|---|---|---|---|
| EP | | 2381159 A2 | 10/2011 | | |
| EP | | 2602544 A1 | 6/2013 | | |
| NL | WO | 2013124827 A1 * | 8/2013 | ............ | F21K 9/175 |
| WO | | 2012127371 A1 | 9/2012 | | |

* cited by examiner

LED RETROFIT LAMP

CROSS-REFERENCE TO PRIOR APPLICATIONS

This application is the U.S. National Phase application under 35 U.S.C. §371 of International Application No. PCT/EP2014/068434, filed on Aug. 29, 2014, which claims the benefit of European Patent Application No. EP13182262.9 filed on Aug. 29, 2013. These applications are hereby incorporated by reference herein.

FIELD OF THE INVENTION

The invention relates to an LED retrofit lamp and to a method of operating an LED retrofit lamp with an alternating current.

BACKGROUND OF THE INVENTION

WO2012127371A1 discloses an electric lamp having two pairs of external connection pins adapted for connecting the lamp to a voltage source for powering an internal lighting module. Each pair of pins is disconnected from the lighting module by an open switch unless a non-zero electric voltage is applied to the pair and causes the switch to close. The lamp may be fitted in a switch-start fixture, providing an ohmic connection between two pins in different pairs, as well as a rapid-start fixture, with a capacitive connection.

Further measures might become necessary in order to meet increasing safety requirements for LED retrofit lamps.

SUMMARY OF THE INVENTION

It is an object of the present invention to provide an LED retrofit lamp meeting reinforced insulation requirements. It is a further object of the present invention to provide a corresponding method of operating an LED retrofit lamp.

In a first aspect of the invention, an LED retrofit lamp adapted for operation with an alternating current is provided. The LED lamp comprises
an LED unit,
a mains current line;
a first switching device and a second switching device, said first switching device, said second switching device, and said LED unit being connected in series along said mains current line; and
a control unit adapted to
detect an ignition voltage on said mains current line;
in response to detecting said ignition voltage on said mains current line, set said first and second switching devices at least temporarily to a conducting state.

The first and second switching devices may be, e.g., electrically operated switches, such as relays. Before insertion of the LED retrofit lamp into the lamp fixture, or before connecting the lamp to power, both switching devices are preferably in a non-conducting state. Accordingly, the two ends of the TL tube are isolated from each other, because no current may flow through the switching devices on the mains current line as long as the switching devices are non-conducting. The control unit is adapted to detect an HF signal with sufficient amplitude and duration applied to the mains current line. That is, upon inserting both ends of the TL tube into an electric fixture, an ignition voltage on the mains current line is detected. Based on the occurrence of an ignition voltage on the mains current line, the control unit may then cause the first and second switching devices to change from a non-conducting state to a conducting state. Only after the first and second switching devices have been set to a conducting state, current may flow through the first and second switching devices on the mains current line and the lamp may be illuminated. If on the other hand, only one end of the tube lamp is inserted into the fixture, in most cases no HF signal is generated by the ballast and in some cases no regular or sufficient HF signal is provided on the mains current line and the first and second switching devices remain non-conducting. That is to say, some ballast generates some ignition voltage in the situation when the lamp is connected to the "hot" side of the ballast output, but such ignition voltage will only last for a short time. Accordingly, safety is ensured when installing an LED retrofit lamp according to the first aspect of the invention. Having two switching devices rather than only one switching device provides for the additional advantage of improved safety of the circuit. Namely, if one of the switching devices fails such that, without connecting the lamp to power, the failed switching device is in a conducting state, the other switching device would still provide for basic insulation along the mains current line. The control unit may set the first and second switching devices to a conducting state by supplying a voltage signal. In particular, if the first and second switching devices comprise respective first and second relays, the control unit may set the first and second relays to a conducting state, e.g., by providing a supply voltage to the relay coil, in turn switching the relay contact such that the relay closes (i.e., becomes conducting).

The lamp is adapted for operation with an alternating current, such as for example provided by a 50/60 Hz mains supply line via a suitable power supply unit, e.g., a ballast unit of a lamp fixture.

The LED unit may preferably comprise any type of solid state light source, such as an inorganic LED, organic LED, or a solid state laser, e.g., a laser diode. For general lighting applications, the LED unit may preferably comprise at least one high-power LED, i.e., having a luminous flux of more than 1 lm. For retrofit applications, it is especially preferred that the total flux of the LED unit is in the range of 300 lm to 10000 lm, which corresponds to a typical 5 W to 80 W fluorescent tube lamp. Most preferably, the forward voltage of the LED unit is in the range of 30 V to 200 V, particularly 50 V to 100 V for a 4-foot-lamp (1 foot=0.3048 m).

The LED unit may certainly comprise further electric or electronic components, such as a driver unit, e.g. to set the brightness and/or color, rectifying circuitry, a smooting stage, a filter capacitor and/or a discharging protection diode. The LED unit may comprise more than one LED, for example in applications where colour-control of the emitted light is desired, e.g. using RGB-LEDs, or to further increase the luminous flux of the LED lamp. Furthermore, the LED lamp may comprise more than one LED unit.

The first and second switching devices may be of any suitable type to be recurrently controlled to the conducting and non-conducting state. As will be discussed in the following, at least one of the states can be set by the control unit. The first and second switching devices should in addition be adapted to the electrical specifications of the application in terms of maximal voltage and current.

The LED lamp may be adapted to be connected to a PL-type fluorescent lamp fixture. However, preferably, the LED lamp comprises at least a first and second lamp cap. The lamp caps should be adapted to provide an electrical connection of the LED unit and the compensation circuit with the respective fixture and thus with power. The lamp caps may thus for example be provided with a corresponding contact element, such as a bi-pin base. For example, the lamp caps may have the electrical and/or mechanical properties of a T5 or T8-fluorescent lamp.

Preferably, the LED lamp is an LED tube lamp, such as a linear tube lamp. Most preferably, the LED lamp is a double-capped tube lamp, e.g. having a first and second lamp cap, arranged on opposing ends of a housing.

According to a preferred embodiment, said control unit is further adapted to set said first and second switching devices at least temporarily to a non-conducting state in response to a power reduction on said mains current line. Thus, upon disconnecting one end of the TL tube lamp with the respective fixture, current on the mains current line stops flowing. Such change on the mains current line may be detected, e.g., by the control unit. The control unit then changes the state of the first and second switching devices from conducting to non-conducting. Accordingly, the two ends of the LED retrofit lamp are insulated from each other, because no current may flow along the first and second switching devices along the mains current line. Thus, a user attempting to de-install the lamp according to a preferred embodiment of the invention does not risk receiving an electrical shock by touching the contacts at one end of the lamp if the other end of the lamp is still connected to power.

According to a further preferred embodiment, the control unit comprises at least one capacitor coupled in parallel to the first and second switching devices. The at least one capacitor is coupled in parallel to the first and second switching devices along the mains current line. Preferably, the control unit comprises at least two capacitors. The first capacitor may be coupled in parallel to the first switching device. The second capacitor may be coupled in parallel to the second switching device. Upon inserting both ends of the LED retrofit lamp into its fixture and connecting an HF voltage, an HF current flows through the at least one capacitor. The HF current may provide an ignition voltage along the mains current line. The ignition voltage may then be detected by the control unit, e.g., by means of the at least one capacitor.

According to a further preferred embodiment, during a startup mode of operation, said at least one capacitor is adapted to detect said ignition voltage on said mains current line. During a startup mode of operation, e.g., upon inserting both ends of the LED retrofit lamp into its fixture and connecting an HF voltage, an HF current flows through the at least one capacitor. The HF current may provide an ignition voltage along the mains current line. The ignition voltage may then be detected by the at least one capacitor. Accordingly, the control unit may, upon detection of the ignition voltage, set the first and second switching devices into a conducting state. Setting the first and second switching devices into a conducting state may be performed, e.g., by providing a voltage signal to the first and second switching devices. The voltage signal may, e.g., be a signal derived from the ignition voltage.

According to a further preferred embodiment, said control unit is further adapted to derive a supply voltage for said first and second switching devices from said mains current line. The first and second switching devices may be set to and/or maintained in a conducting state, e.g., by providing a supply voltage to the first and second switching devices. During startup, the supply voltage may be derived, e.g., based on the ignition voltage on the mains current line. During steady-state operation, the supply voltage may be derived, e.g., based on the mains current on the mains current line. The supply voltage may be derived from the mains current line during startup and steady-state operation, or only during startup, or only during steady-state operation. In case the first and second switching devices comprise first and second relays, the supply voltage may be provided to the respective coils in order to close the first and second relays.

According to a further preferred embodiment, the control unit comprises a voltage supply unit, said voltage supply unit adapted to provide a supply voltage to the first and second switching devices. The voltage supply unit may, e.g., tap energy from the mains current line in order to generate a supply voltage based at least in part on the mains voltage. Various examples of tapping energy from the mains current line are described herein below. In particular, by providing a supply voltage to the first and second switching devices, the control unit may control, whether the first and second switching devices are in a conducting or non-conducting state.

According to a further preferred embodiment, the voltage supply unit is insulated from said mains current line. The voltage supply unit may, e.g., tap energy from the mains current line in order to generate a supply voltage based at least in part on the mains voltage. In particular, the voltage supply unit may tap energy from the mains current line without being electrically connected to the mains current line. According to one example explained in more detail herein below, the voltage supply unit may be connected to the secondary winding of a transformer. The transformer's primary winding may be connected to the mains current line such that a voltage is induced at the secondary winding if current flows through the primary winding. Thereby, the voltage supply unit would be able to tap energy from the mains current line, albeit insulated therefrom.

According to a further preferred embodiment, the LED lamp is adapted for operation with an electrical ballast. The ignition voltage on said mains current line corresponds to an HF signal from said electrical ballast. By operating the LED lamp with an electrical ballast, the amount of current running through the LED lamp may be limited. Upon installing both ends of the LED lamp into their respective fixtures, the electrical ballast may provide an HF signal along the mains current line, which, in turn, may be detected as an ignition voltage by the control unit.

According to a further preferred embodiment, said control unit comprises a startup circuit, wherein said startup circuit is adapted to detect the HF signal from said electrical ballast. Detection of the ignition voltage may be carried out by a specialized startup circuit, which responds to an HF signal being provided to the mains current line.

According to a further preferred embodiment, the control unit is adapted to control said first and second switching devices to at least temporarily disconnect said LED unit from power. The control unit is further adapted to control said first and second switching devices to at least temporarily connect said LED unit to power. By setting the first and second switching devices to a non-conducting state, the control unit may control said first and second switching devices to at least temporarily disconnect said LED unit from power. By setting the first and second switching devices to a conducting state, the control unit may control said first and second switching devices to at least temporarily connect said LED unit to power. Thus, the LED unit may be disconnected from power completely as long as the first and/or second switching devices are in a non-conducting state.

According to a further preferred embodiment, during a steady-state mode of operation, said at least one capacitor is bypassed by the first and second switching devices. The at least one capacitor is coupled in parallel to the first and second switching devices along the mains current line. Preferably, the control unit comprises at least two capacitors. The first capacitor may be coupled in parallel to the first switching device. The second capacitor may be coupled in parallel to the second switching device. Upon inserting both ends of the LED retrofit lamp into its fixture and connecting an HF voltage, an HF current flows through the at least one capacitor. The HF current may provide an ignition voltage along the mains current line. The ignition voltage may then be detected by the control unit, e.g., by means of the at least one capacitor. In response, the first and second switching devices may be set to a conducting state. Current may then flow through the first and second switching devices rather than through the at least one capacitor.

According to a further preferred embodiment, said first switching device comprises a first relay, and wherein said second switching device comprises a second relay. The first and second relays may use, e.g., an electromagnet to operate a switching mechanism mechanically, but the skilled person is aware of other operating principles of relays as well. By employing first and second relays, it is possible to control the current flowing along the mains current line by a low-power signal, such as a supply voltage provided to first and second relays.

According to a further preferred embodiment, the control unit comprises a transformer having a primary and a secondary winding, wherein the primary winding is connected in series along the mains current line. By connecting the transformer as described, a current flowing through the primary winding induces a voltage at the secondary winding. Accordingly, the control unit may generate a supply voltage to the first and second switching devices, which is based, at least in part, on the voltage induced at the secondary winding.

According to a further preferred embodiment, the control unit further comprises a rectifier connected to said secondary winding, the rectifier being adapted to convert a voltage induced at the secondary winding into a DC supply voltage, said DC supply voltage being provided to the first and second switching devices.

According to a further preferred embodiment, said control unit further comprises a filter capacitor for smoothing said DC voltage, said filter capacitor coupled in parallel to the first and second switching devices.

According to a further preferred embodiment, during said startup mode of operation, said control unit is further adapted to convert said ignition voltage to an initial supply voltage and to provide said initial supply voltage to the first and second switching devices. The first and second switching devices are adapted to change to a conducting state upon receipt of said ignition voltage. The ignition voltage may be provided directly to the first and second switching devices in order to change their respective states from non-conducting to conducting. Accordingly, the circuitry can be kept simple because no additional startup circuit is required to set the first and second switching devices conducting.

According to a further preferred embodiment, the control unit comprises a voltage supply unit, said voltage supply unit being adapted to provide a supply voltage to the first and second switching devices; said voltage supply unit comprising a shunt supply circuit being adapted to tap energy from said mains current line during a steady-state mode of operation. During startup (i.e., upon connecting power to both ends of the LED lamp), it is possible to provide the converted ignition voltage to the first and second switching devices. That is to say, the ignition voltage is not necessarily directly provided to the switches, instead it is adapted for providing energy to close the two switches upon detection of ignition. However, in this case, it is further advantageous to provide circuitry which maintains the first and second switching devices in a conducting state, once the LED lamp is in a steady-state operation. This can be achieved by providing a voltage supply unit tapping energy from the mains current line. The voltage supply unit preferably comprises a shunt supply circuit, which taps energy from the mains current line. Examples for possible implementations of a shunt supply circuit are described herein below.

According to a further preferred embodiment, the voltage supply unit is connected in-between said first and second switching devices. In particular, the first switching device and the voltage supply unit may be connected in series along the mains current path, and the voltage supply unit and the second switching device may be connected in series along the mains current path. That way, a current signal on the mains current line passes the first switching device before passing the voltage supply unit, and the current signal passes the voltage supply unit before passing the second switching device. Likewise, a current signal on the mains current line may pass the second switching device before passing the voltage supply unit, and the current signal may pass the voltage supply unit before passing the first switching device. An advantage of this preferred embodiment is that only basic insulation requirements must be met for the first and second switching devices. In particular, if the first switching devices comprises a first relay with a first coil and a first contact, and the second switching device comprises a second relay with a second coil and a second contact, the respective relay coil-to-contact paths must only meet basic insulaton requirements.

According to a further preferred embodiment, the control unit comprises a voltage supply unit, said voltage supply unit being adapted to provide a supply voltage to the first and second switching devices; said voltage supply unit comprising a shunt supply circuit adapted to tap energy from said mains current line during a steady-state mode of operation. The shunt supply circuit comprises a full diode bridge and a shunt switch; and/or an active full bridge comprising at least two diodes and at least two MOSFETs; and/or an asymmetrical half-bridge. When the switch (or the MOSFET) is in a conducting state, the mains current path is bypassed. When the switch (or the MOSFET) is n a non-conducting state (i.e., turned off), the main current may be used, e.g., to charge a filter capacitor. Accordingly, it is possible to regulate the low supply voltage by controlling the state of the switch (or of the MOSFET). The accordingly regulated supply voltage may then be used to provide energy to the switching devices. In particular, if the switching devices comprise first and second relays, the regulated supply voltage may provide energy to the respective relay coils. Preferably, the shunt supply circuit comprises an asymmetrical half-bridge, because such circuitry comprises fewer components and incurs less costs.

According to a further preferred embodiment, the first relay comprises a first coil, and the second relay comprises a second coil. The first and second coils may be connected to receive a supply voltage from said control unit. Said first and second relays change from a non-conducting state to a conducting state upon receipt of said supply voltage from said control unit.

According to a further preferred embodiment, the first and second relays are normally open relays. By providing first and second relays in a normally open state, the first and second relays are normally non-conducting. In other words, if no supply voltage is applied to the relay coils, no current may flow along the mains current line of the LED retrofit lamp. However, if a supply voltage is applied to the relay coils, the first and second relays close and thereby change into a conducting state such that current may flow along the mains current line of the lamp.

According to a further preferred embodiment, the first and second coils are connected to receive a supply voltage from said control unit.

In a second aspect of the invention, a method of operating an LED retrofit lamp with an alternating current is provided. Said LED lamp comprises an LED unit, a mains current line, a first switching device and a second switching device, said first switching device, said second switching device, and said LED unit being connected in series along said mains current line. Said method comprises the steps of
  detecting an ignition voltage on said mains current line;
  in response to detecting said ignition voltage on said mains current line, setting said first and second switching devices at least temporarily to a conducting state.

It shall be understood that the LED retrofit lamp of claim 1 and the method of operating an LED retrofit lamp of claim 15 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
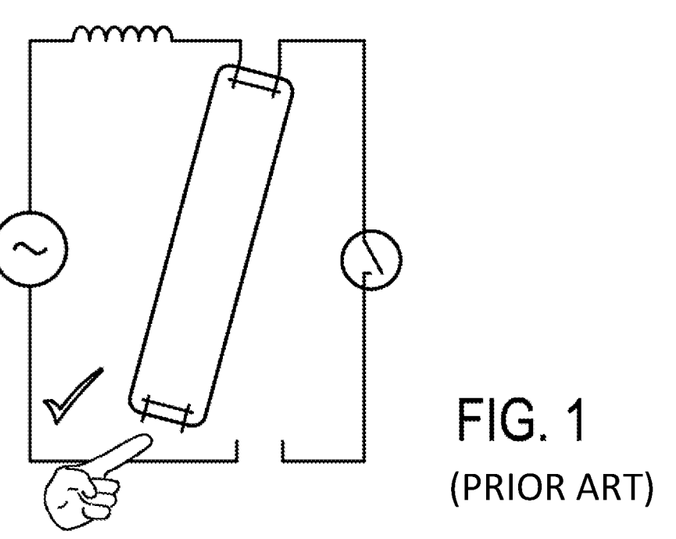
FIG. 1 shows schematically and exemplarily an example of a conventional TL-tube.

FIG. 1 shows schematically and exemplarily an example of a conventional TL-tube. Conventional TL tube lamps are safe due to the fact that the gas inside the tube first has to be ignited before there is a conducting path between the two connections on the end of the tube. Ignition is carried out via a combination of starter and ballast or a HF generated high voltage. This safety is necessary when the tube is being installed into a fixture while the voltage is not disconnected from the mains. In the situation when the lamp is not inserted correctly (e.g., one side inserted and the other not yet), the one side of the lamp is connected to live mains and the electrical contacts of the other side are insulated from the live mains As illustrated by FIG. 1, the pins of a conventional TL-Tube are safe to touch.

Figure 2:
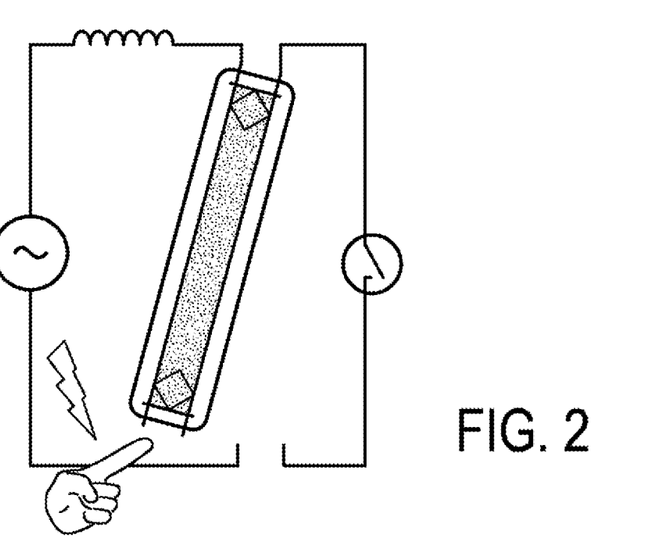
FIG. 2 shows schematically and exemplarily an example of a retrofit TL-tube with LEDs and electronics.

However, upon using LED-based lamps, such as LED-based retrofit lamps, there is a conducting path between the electronics in the two ends of the tube. Thus, safety is not guaranteed. This is illustrated by FIG. 2, which shows a retrofit TL-Tube (TLED) comprising LEDs and electronics (i.e., LED driver). The LEDs and the driver do not provide sufficient protection against electrical shock of touching the pins.

Figure 3:
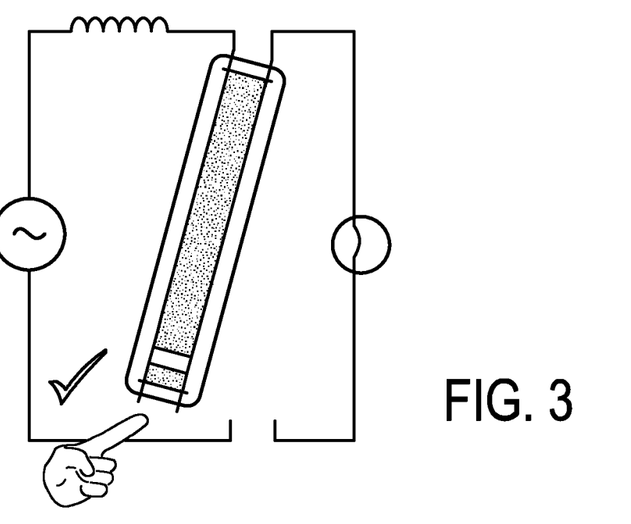
FIG. 3 shows schematically and exemplarily an example of a retrofit TL-tube with isolated LEDs and electronics.

A known solution to this problem is illustrated in FIG. 3, showing a TL-retrofit with isolated electronics and LEDs. Power is taken from a first side of the tube, while the other side is isolated from the first side by employing a short between the two connections on that side.

Figure 4:
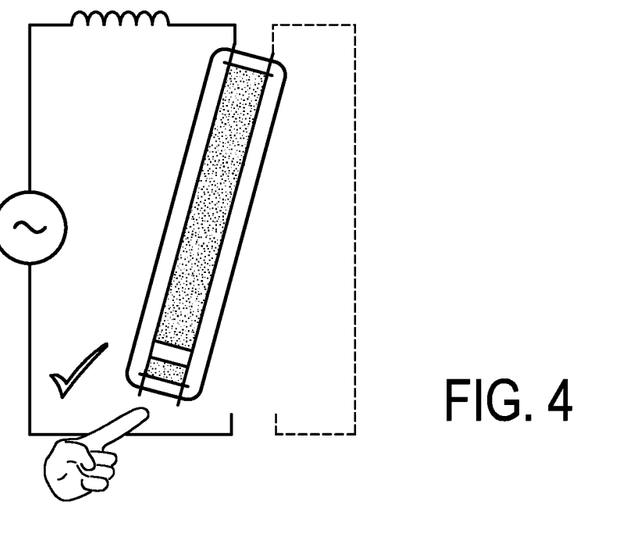
FIG. 4 shows schematically and exemplarily an example of a retrofit TL-tube with isolated LEDs and electronics on an HF ballast fixture.

In this case there is no conducting path between the two sides of the lamp. However, the starter must be replaced by a short (e.g., a fuse) in order to get the lamp working. Another disadvantage is that in the case of HF ballast there is neither a starter nor the wires for creating a short over the lamp without opening the fixture and implementing the short wires. This is time consuming and costly when switching over to the LED retrofit lamps. FIG. 4 illustrates how in a TL-retrofit with isolated electronics and LEDs on HF ballast fixture, rewiring is needed to make the lamp work.

There is increased interest in providing an HF ballast compatible TLED. In this regard, pin safety is one of the key challenges. A possible solution comprises electrical pin safety with a relay. An advantage of relay pin safety is its fool-proof use. Further, the look and feel of a normal lamp is maintained, since there are no buttons (e.g., mechanical safety switches) at the end cap.

Figure 5:
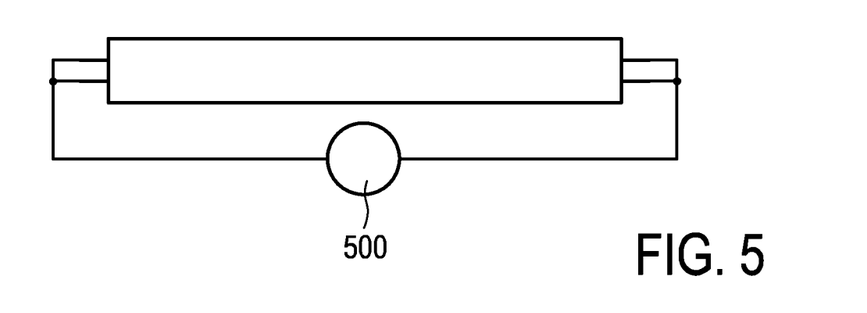
FIG. 5 shows schematically and exemplarily an example of testing the dielectric strength of an LED tube.

FIG. 5 illustrates an example setup to test the dielectric strength of the LED tube. As an example, a test voltage 500 may be applied to both ends of the tube in order to assess if breakdown or flashover occurs.

Figure 6A:
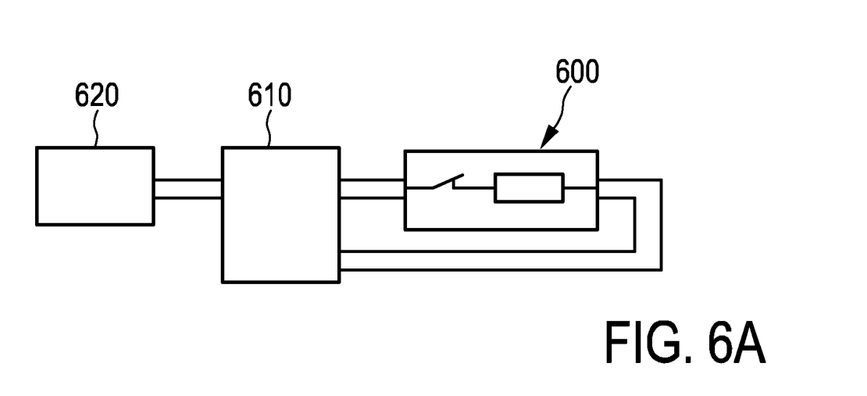
FIGS. 6A and 6B show schematically and exemplarily an example of a relay pin safety solution.
Figure 6B:
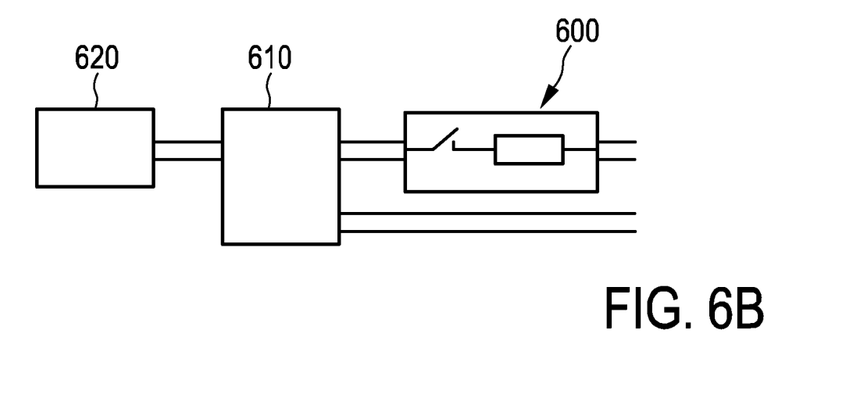

FIG. 6 illustrates the basic principle of providing pin safety with a relay. Lamp 600 comprises a relay inside and may be connected to HF ballast 610 and mains power supply 620, which is preferably a 230-V-mains power supply. The relay is closed when both ends of lamp 600 are energized (FIG. 6A) and stays open when only one end of the tube 600 is energized (FIG. 6B).

Particular interest resides in complying with the insulation requirements and providing a single fault safe solution. To date there are little electrical pin safety solutions on the market for HF compatible TLED that fulfils the requirement of reinforced insulation.

Figure 7:
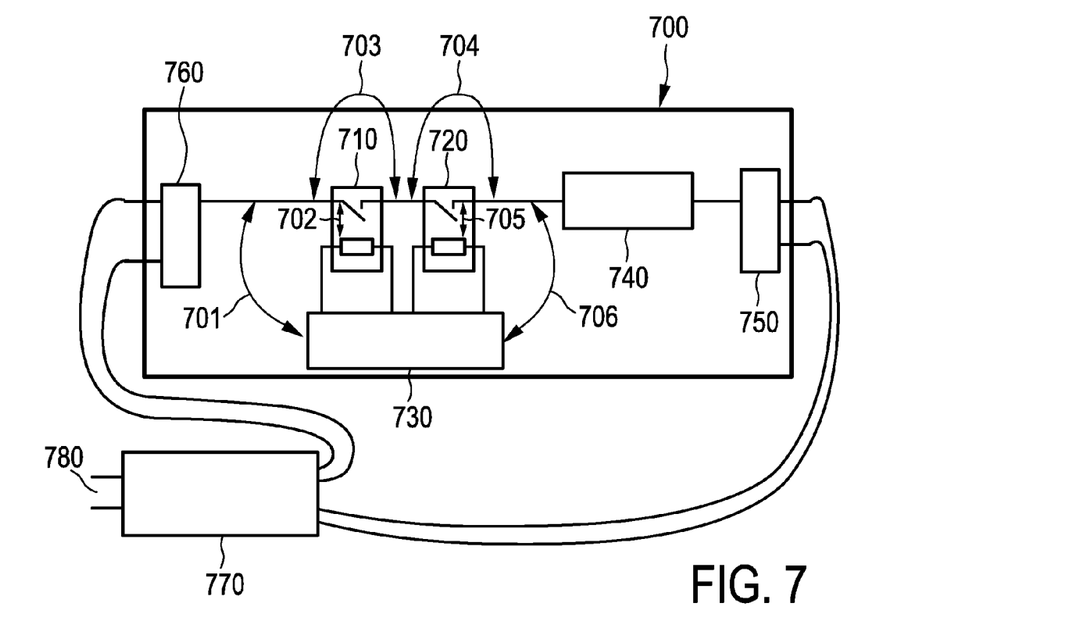
FIG. 7 shows schematically and exemplarily an embodiment of an LED retrofit lamp implementing a proposed TLED relay pin safety solution.

FIG. 7 shows a block diagram of the proposed TLED relay pin safety solution, illustrating the basic principle. Lamp 700 comprises LED load and internal driver 740, filament emulation circuitry 750, 760, and a relay pin safety circuit comprising first relay 710, second relay 720, and relay voltage supply 730. Lamp 700 needs to meet reinforced insulation requirements between the pins from one end to the other. A solution provides first and second switching devices (such as first and second relays 710, 720)

and an insulated voltage supply 730 for the relay coils. Both relays 710, 720 are certified for basic insulation between the open contact and between the coil and contact.

There are multiple parallel paths 701, 702, 703, 704, 705, 706 between the two ends of the tube, e.g., via the two switches of the two relays, via the coil to contact of the first relay and low voltage supply to the driver and LEDs, via the switch of the first relay, contact-to-coil of the second relay, and low voltage supply to the driver and LEDs, via the left end to the low voltage supply, and to the driver and LEDs.

All those paths 701, 702, 703, 704, 705, 706 must meet reinforced insulation requirements. Reinforced insulation is provided by a single insulation system which provides a degree of protection against electric shock equivalent to double insulation. In other words, reinforced insulation can be constructed with two basic insulations. From FIG. 7, it can be seen that reinforced insulation may be achieved by constructing the circuit accordingly. The system is single fault safe, i.e., safe when bridging one of the insulation barriers.

The relay coil supply voltage may comprise a startup circuit that detects HF signal from ballast 770 (which is connected to mains power supply 780) and a steady-state supply that may be derived from the ballast output current for supplying DC voltage to the first and second relay coils.

A relay suitable for a preferred embodiment must be released according to basic insulation requirements (with respect to insulation between coil and contact, and between the open contacts).

Relays 710, 720 stay open when only one side of lamp 700 is inserted. The main current can only flow, when both sides of lamp 700 are fully inserted in the lamp holders. If only one side of lamp 700 is inserted, the relay coil will not get a voltage and the open contact provides pin safety.

The relay contact switches the current from HF ballast 770. HF current from ballast 770 can, e.g., be detected via a Y-capacitor and provide initial voltage to power the relay coil, so that the contacts of first and second relays 710, 720 close. The supply is taken over by the steady state coil voltage supply 730.

Insulation barriers for relay coil voltage supply 730 can be constructed using safety components like transformers, Y-capacitor, etc. Examples are explained herein below.

Figure 8:
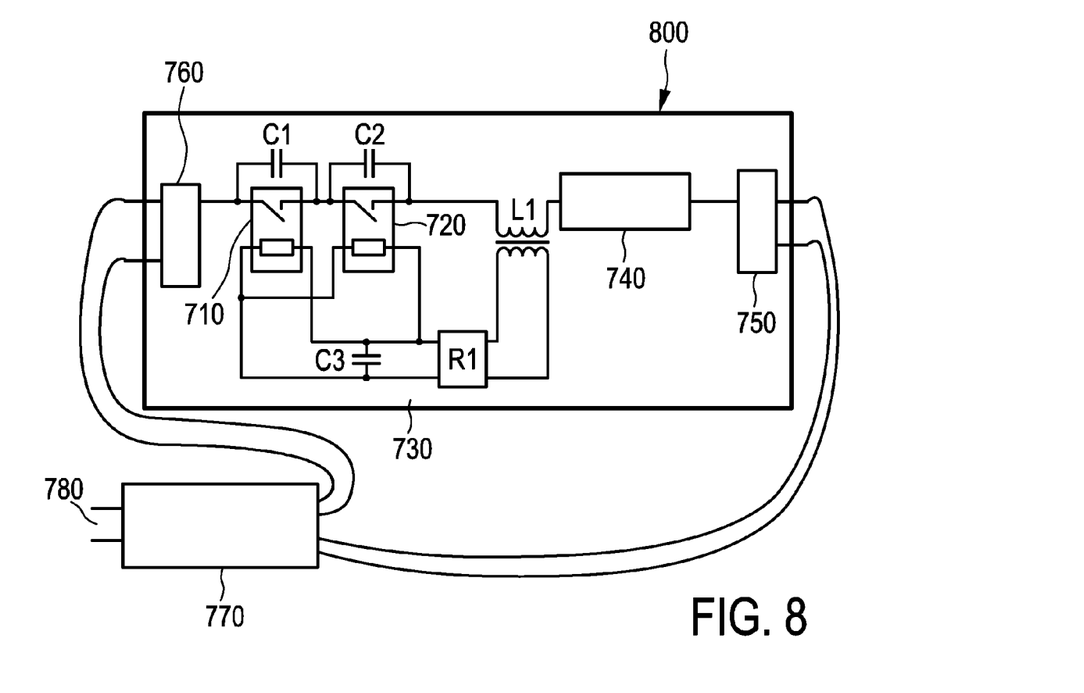
FIG. 8 shows schematically and exemplarily a further embodiment of an LED retrofit lamp implementing a proposed TLED relay pin safety solution.

FIG. 8 shows one example to implement the relay coil voltage supply 730 in lamp 800. Two Y-capacitors C1, C2 (both may be, e.g., safety capacitors) are connected in parallel to first and second relays 710, 720. The relay coils are energized from the secondary winding of transformer L1 (L1 being, e.g., part of driver circuit 740 or of a control unit). During a startup phase, initially the contacts of relays 710 and 720 stay open and the HF current generated by ballast 770 flows through capacitors C1, C2 and the primary winding of L1. Consequently a voltage is induced at the secondary winding of L1. This voltage is converted to a DC voltage by rectifier R1. Further, the voltage may be preferably smoothed out by filter capacitor C3. As soon as the DC voltage reaches a certain level, the relay contacts of first and second relays 710, 720 close. Then, the Y-capacitors C1, C2 are bypassed by first and second relays 710, 720. Relays 710, 720 thus carry the main current in a steady-state operating mode. As soon as mains power 780 is switched off or one side of lamp 800 is removed from the lamp holder, the coil supply 730 diminishes and the relay contacts will disconnect.

Insulation in this example is provided by relays 710, 720 (basic insulation), Y-capacitors C1, C2 (basic insulation), and by primary and secondary windings of transformer L1 (basic insulation). The described setup therefore meets reinforced insulation requirements.

Figure 9:
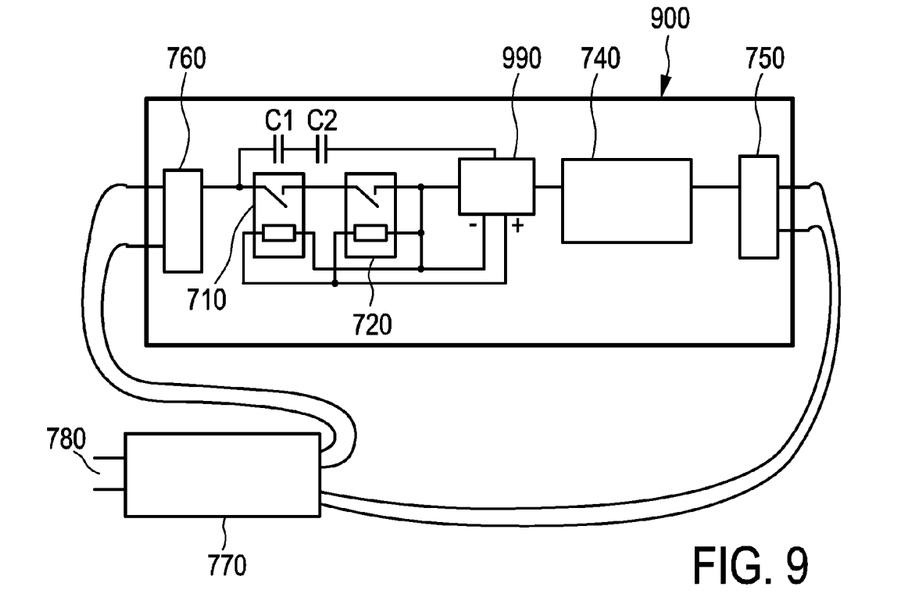
FIG. 9 shows schematically and exemplarily a further embodiment of an LED retrofit lamp implementing a proposed TLED relay pin safety solution.

FIG. 9 shows another example of implementing a relay pin safety into an LED lamp 900, which may preferably be a HF-compatible TLED 900 with a non-isolated shunt supply 990 for the relay coil. Relay voltage supply during startup phase is arranged via Y-capacitors C1, C2. Initial HF current flows via Y-capacitors C1, C2. This current energizes the coils of first and second relays 710, 720 and closes the respective contacts. In a steady-state operating mode, the relay coil supply voltage is derived by shunt supply 990 by tapping energy from the main current flow path by using a switching network (some examples of which are shown in FIG. 11). However, in this circuit the coil-to-contact path of the first relay 710 must meet reinforced insulation requirements. Capacitors C1 and C2 meet basic insulation requirements (i.e., C1 and C2 may be of Y-2 type). However, capacitors C1 and C2 may be replaced by a single capacitor (not shown), as long as the capacitor is of Y-1 type (i.e., providing reinforced insulation). The single capacitor is then connected in parallel with the string of two relays 710, 720.

Figure 10:
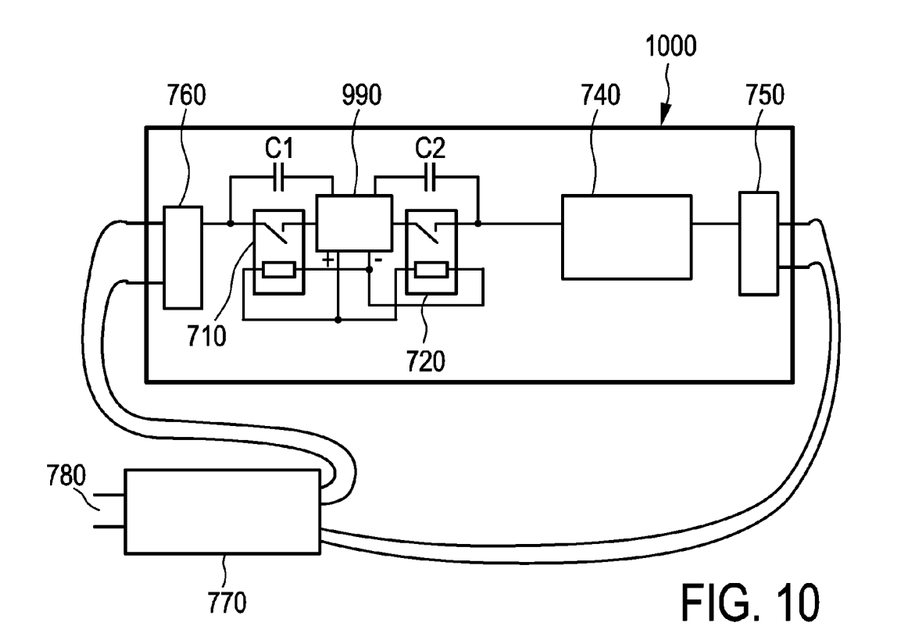
FIG. 10 shows schematically and exemplarily a further embodiment of an LED retrofit lamp implementing a proposed TLED relay pin safety solution.

Furthermore, the system can be implemented as illustrated by FIG. 10, showing relay pin safety for an LED lamp 1000, which may preferably be an HF compatible TLED 1000 with a non-isolated shunt supply 990 arranged in between the two relays 710, 720. The relay coil shunt voltage supply 990 is located between the two relays 710, 720. This setup provides the advantage that the relay coil-to-contact must meet only basic insulation requirements. In particular, capacitors C1 and C2 may be Y-capacitors. The principle of the circuit is similar to the one in FIG. 9.

Figure 11A:
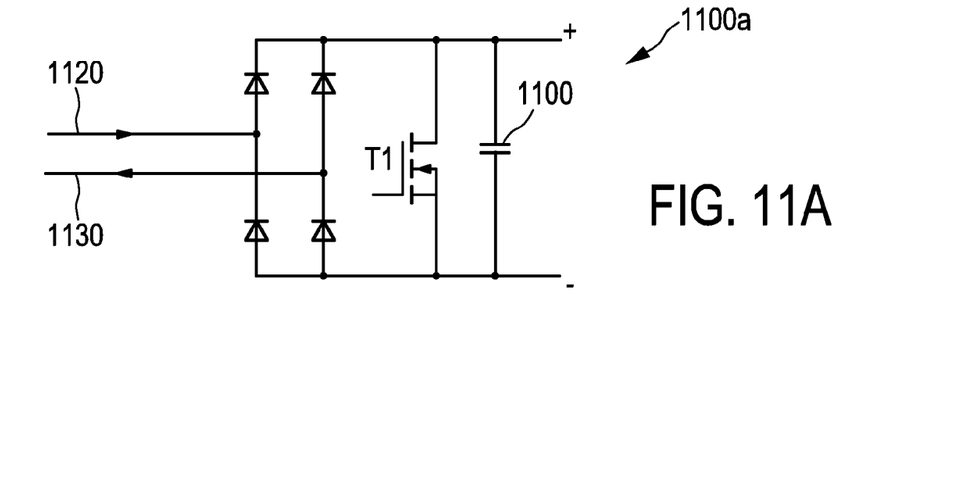
FIG. 11 shows schematically and exemplarily various implementations of a shunt supply for the relay coil voltage.
Figure 11B:
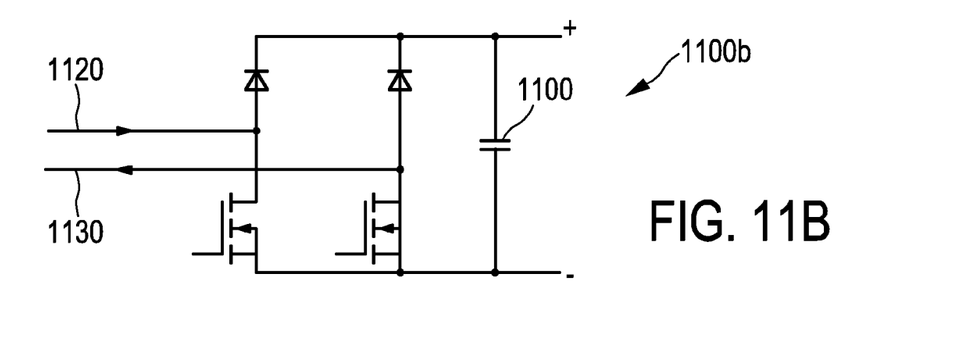
Figure 11C:
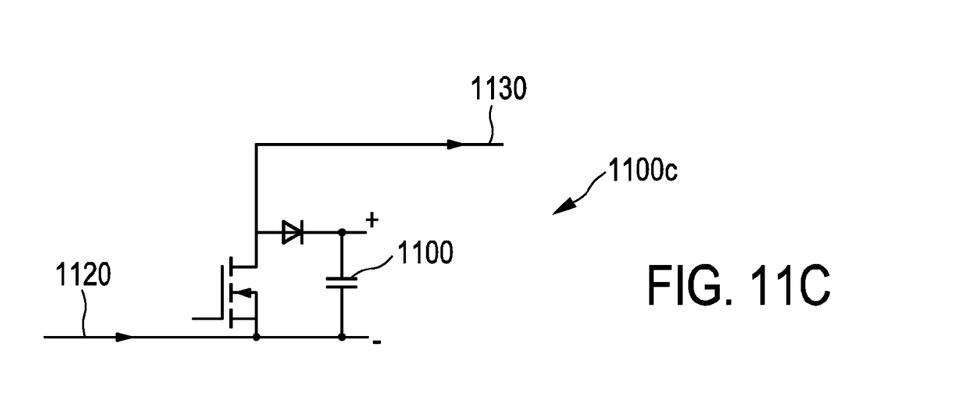

Relay coil voltage supply 990 in steady state can be realized by tapping energy from the main current path. There are various ways to implement this, as illustrated by FIG. 11. When a switch (e.g., a MOSFET) conducting the mains current (which enters relay coil voltage supply 990 via line 1120 and exits relay coil voltage supply 990 via line 1130) is bypassed and when the MOSFET is turned off, the mains current charges the filter capacitor. Therefore by controlling ON and OFF states of the MOSFET, low voltage supply 1110 can be regulated. This regulated voltage provides energy to coils of first and second relays 710, 720. FIG. 11A shows a full diode bridge and shunt switch. FIG. 11B shows an active full bridge comprising two diodes and two MOSFETs. FIG. 11C shows an asymmetrical half bridge. The circuit shown in FIG. 11C is preferred because it comprises fewer components and may be realized at lower cost.

Figure 12:
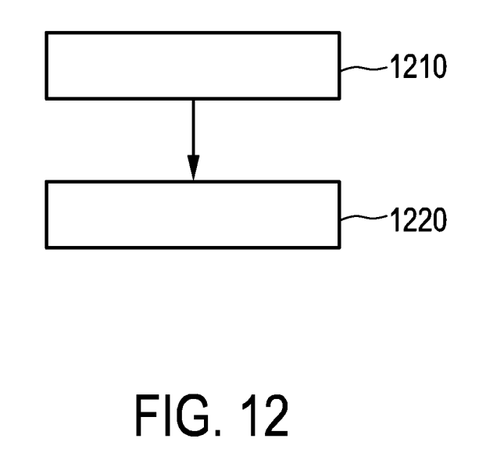
FIG. 12 shows a flowchart schematically and exemplarily illustrating an embodiment of a method of operating an LED retrofit lamp.

In the following an embodiment of method of operating an LED retrofit lamp with an alternating current, said LED lamp comprising an LED unit, a mains current line, a first switching device and a second switching device, said first switching device, said second switching device, and said LED unit connected in series along said mains current line, will exemplarily be described with reference to a flowchart shown in FIG. 12.

In step 1210, an ignition voltage on said mains current line is detected.

In step 1220, said first and second switching devices are set at least temporarily to a conducting state in response to detecting said ignition voltage on said mains current line.

An example application of the invention relates to providing pin safety in any HF ballast compatible LED retrofit lamp for TL retrofit fixtures. The invention is particularly relevant for T8 LED tubes compatible with HF ballast.

The LED lamp can comprise any type of switching devices that allows changing between a conducting and non-conducting state.

Although in the above described embodiments, the switching devices comprise relays, these embodiments are preferred embodiments only and in another embodiment the switching devices can comprise, e.g., MOSFETs, Triac, IGBT, etc.

Although in the above described embodiments certain configurations of voltage supply units are shown, the invention is not limited to a certain configuration of voltage supply units. In an embodiment, the voltage supply unit does not comprise a rectifier, a filter capacitor, or a transformer.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like detecting an ignition voltage on the mains current line, detecting a reduction in power on the mains power line et cetera performed by one or several units or devices can be performed by any other number of units or devices. For example, the detection of an ignition voltage on the mains current line can be performed by a single unit of by any other number of different units. The determinations and/or the control of the LED lamp in accordance with the above described operating method can be implemented as program code means of a computer program and/or as dedicated hardware.

Any reference signs in the claims should not be construed as limiting the scope.

The present invention relates to an LED retrofit lamp adapted for operation with an alternating current. The LED lamp comprises an LED unit, a mains current line, first and second switching devices (e.g., first and second relays), and a control unit. The control unit detects an ignition voltage on the mains current line. In response to detecting the ignition voltage on the mains current line, the control unit sets the first and second switching devices to a conducting state such that the LED unit is connected to power. By using the first and second switching devices, safety of the LED lamp is improved, in particular when installing the lamp into a fixture designed for fluorescent lamps.

The invention claimed is:

1. An LED retrofit lamp adapted for operation with an alternating current, comprising
   an LED unit,
   a mains current line;
   a first switching device and a second switching device, said first switching device, said second switching device, and said LED unit being connected in series along said mains current line; and
   a control unit adapted to
   detect an ignition voltage on said mains current line;
   in response to detecting said ignition voltage on said mains current line, set said first and second switching devices at least temporarily to a conducting state, wherein the control unit comprises at least one capacitor coupled in parallel to the first and second switching devices, said at least one capacitor being adapted, during a startup mode of operation, to detect said ignition voltage on said mains current line.

2. The LED lamp according to claim 1, wherein said control unit is further adapted to set said first and second switching devices at least temporarily to a non-conducting state in response to a power reduction on said mains current line.

3. The LED lamp according to claim 1, wherein said control unit is further adapted to derive a supply voltage for said first and second switching devices from said mains current line.

4. The LED lamp according to claim 1, wherein said first and second switching devices change from a non-conducting state to said conducting state upon receipt of a supply voltage from said control unit.

5. The LED lamp according to claim 1, wherein said first switching device comprises a first relay, and wherein said second switching device comprises a second relay.

6. The LED lamp according to claim 3, wherein the control unit comprises a transformer having a primary and a secondary winding, wherein the primary winding is connected in series along the mains current line.

7. The LED lamp according to claim 6, wherein the control unit further comprises a rectifier connected to said secondary winding, the rectifier being adapted to convert a voltage induced at the secondary winding into a DC supply voltage, said DC supply voltage being provided to the first and second switching devices.

8. The LED lamp according to claim 1, wherein, during said startup mode of operation, said control unit is further adapted to convert said ignition voltage to an initial supply voltage and to provide said initial supply voltage to the first and second switching devices, wherein said first and second switching devices are adapted to change to a conducting state upon receipt of said ignition voltage.

9. The LED lamp according to claim 1, wherein the control unit comprises a voltage supply unit, said voltage supply unit being adapted to provide a supply voltage to the first and second switching devices; said voltage supply unit comprising a shunt supply circuit being adapted to tap energy from said mains current line during a steady-state mode of operation.

10. The LED lamp according to claim 1, wherein the control unit comprises a voltage supply unit, said voltage supply unit being adapted to provide a supply voltage to the first and second switching devices; wherein said voltage supply unit is connected in-between said first and second switching devices.

11. The LED lamp according to claim 9, wherein the control unit comprises a voltage supply unit, said voltage supply unit being adapted to provide a supply voltage to the first and second switching devices, said voltage supply unit comprising a shunt supply circuit adapted to tap energy from said mains current line during a steady-state mode of operation, wherein said shunt supply circuit comprises
   a full diode bridge and a shunt switch; and/or
   an active full bridge comprising at least two diodes and at least two MOSFETs; and/or
   an asymmetrical half-bridge.

12. The LED lamp according to claim 5, wherein the first relay comprises a first coil, and wherein the second relay comprises a second coil, wherein the first and second coils are connected to receive a supply voltage from said control unit, wherein said first and second relays change from a non-conducting state to a conducting state upon receipt of said supply voltage from said control unit.

* * * * *